June 2, 1942.　　P. P. STRANDBERG　　2,284,691
REFRIGERATION
Filed March 30, 1940　　2 Sheets-Sheet 1

INVENTOR.
Per Paul Strandberg
BY
his ATTORNEY.

Patented June 2, 1942

2,284,691

UNITED STATES PATENT OFFICE 2,284,691

REFRIGERATION

Per Paul Strandberg, Stockholm, Sweden, assignor to Platen-Munters Refrigerating System, Aktiebolag, Stockholm, Sweden, a corporation of Sweden Application March 30, 1940, Serial No. 326,945
In Germany April 14, 1939

15 Claims. (Cl. 62—119.5)

This invention relates to refrigeration, and more particularly to a refrigeration system embodying evaporation of refrigerant fluid in the presence of an inert gas.

It is an object of the invention to provide improved circulation of fluid in refrigeration systems of this type, particularly to effect a lower concentration of refrigerant in absorption liquid with all of the refrigerant expelled from the absorption liquid being efficiently utilized as, for example, to produce a refrigerating effect.

This is accomplished by providing an auxiliary circuit for inert gas into which refrigerant fluid is vaporized from weak absorption liquid flowing from a place of vapor expulsion to a place of absorption, and providing a place of condensation in such auxiliary circuit in which vaporized refrigerant fluid is liquefied. The liquid refrigerant formed in the place of condensation in the auxiliary circuit may be conducted to a place of evaporation to produce a useful refrigerating effect. Further, the heat of condensation and also the heat of rectification of vapors flowing from the place of vapor expulsion is utilized to effect evaporation of refrigerant fluid into the inert gas from weak absorption liquid.

The invention, together with the above and other objects and advantages thereof, will be better understood upon reference to the following description and the accompanying drawings forming a part of this specification, and of which;

Figure 1:
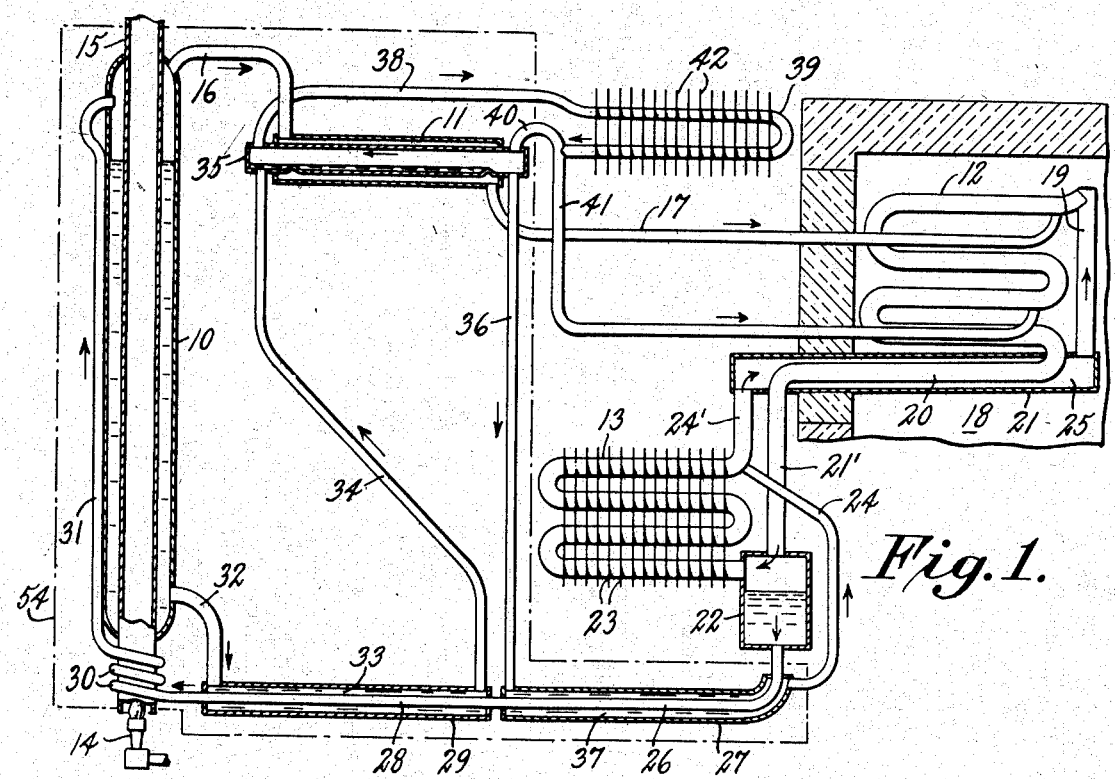
Fig. 1 illustrates more or less diagrammatically a refrigeration system embodying the invention.

In Fig. 1 the invention is embodied in an absorption refrigeration system of a uniform pressure type containing an auxiliary agent or pressure equalizing gas. Such a system includes a generator 10, condenser 11, evaporator 12, and absorber 13. The system contains a solution of refrigerant in absorption liquid, such as ammonia in water, for example, and also an auxiliary agent or inert gas, such as hydrogen. The generator 10 is heated in any suitable manner, as by a gas burner 14, for example, which projects its flame into the lower end of a flue 15. By heating generator 10, refrigerant vapor is expelled out of solution and flows through a conduit 16 into condenser 11.

In condenser 11 the expelled vapors are condensed, as will be described presently, and the liquid condensate flows through a conduit 17 into the upper part of evaporator 12 which may be arranged in a thermally insulated space 18. Liquid refrigerant in evaporator 12 evaporates and diffuses into inert gas which enters through a conduit 19, thereby producing a refrigerating effect with consequent absorption of heat from the surroundings.

The rich gas mixture of refrigerant vapor and inert gas formed in evaporator 12 flows from the lower part thereof through an inner conduit 20 of a gas heat exchanger 21, a conduit 21′, and vessel 22 into the lower end of absorber 13. The absorber 13 is diagrammatically shown in the form of a looped coil having a plurality of fins 23 secured thereto for air cooling.

In absorber 13 the rich gas mixture flows counter-current to downwardly flowing weak absorption liquid which enters through a conduit 24. The absorption liquid absorbs refrigerant vapor from the inert gas and inert gas weak in refrigerant vapor flows from absorber 13 through a conduit 24′, outer passage 25 of gas heat exchanger 21, and conduit 19 into the upper part of evaporator 12.

The circulation of gas in the gas circuit including evaporator 12 and absorber 13 is due to the difference in specific weight of the columns of gas rich and weak, respectively, in refrigerant vapor. Since the rich gas is heavier than the weak gas, force is produced or developed within the system for causing flow of rich gas to absorber 13 and flow of weak gas to the evaporator 12.

Enriched absorption liquid flows from absorber 13 into the vessel 22. From vessel 22 enriched absorption liquid flows through an inner passage 26 of a liquid heat exchanger 27 and an inner passage 28 of a liquid heat exchanger 29 to a coil 30 which is disposed about the lower end of flue 15. Liquid is raised by vapor-liquid lift action from coil 30 through a tube 31 into the upper part of generator 10. Refrigerant vapor expelled out of solution in generator 10, together with refrigerant vapor entering through tube 31, flows through conduit 16 into condenser 11, as explained above.

The weakened absorption liquid from which refrigerant has been expelled flows through a conduit 32, outer passage 33 of liquid heat exchanger 29, conduit 34, a vessel 35 in thermal exchange relation with condenser 11, conduit 36, outer passage 37 of liquid heat exchanger 27, and conduit 24 into the upper part of absorber 13. The circulation of absorption liquid in the circuit just described takes place by gravity action and is effected by the raising of liquid in tube 31 by vapor-liquid lift action in generator 10.

The temperature in generator 10 is a gradient, the temperature being the highest in the lower part of the generator from which region weakened absorption liquid is conducted to vessel 35. In the vessel 35 the weakened absorption liquid flows in thermal exchange relation with the generator vapors and further vaporization of refrigerant from weakened absorption liquid is effected at the condensation temperature of the refrigerant vapor flowing into condenser 11; that is, the latent heat of condensation resulting from condensation of refrigerant vapor in jacket or condenser 11 is utilized to effect heating of weakened absorption liquid to expel refrigerant vapor therefrom. By evaporating refrigerant fluid from weakened absorption fluid in vessel 35, which may be referred to as a vaporizer, the concentration of refrigerant in solution is further lowered. This may be referred to as a stripping action, whereby the weakened absorption solution is stripped of refrigerant and its ability to absorb refrigerant out of inert gas in absorber 13 is increased.

In the arrangement shown and forming an embodiment of the invention, not only is the heat resulting from condensation of refrigerant in condenser 11 utilized to strip the weakened absorption solution of refrigerant in vaporizer 35, but also the heat of rectification is utilized to promote this stripping action. The generator vapor usually is a mixture of refrigerant vapor and absorption liquid vapor, and, when ammonia and water are employed as the refrigerant and absorption liquid, for example, the generator vapor usually is a mixture of ammonia vapor and water vapor. The latent heat of condensation resulting from condensation of water vapor is referred to as heat of rectification, and this is also utilized to effect evaporation of refrigerant vapor from weakened absorption solution. The condensate formed in condenser 11 contains some absorption liquid, therefore, which flows through conduit 17 with the liquid refrigerant to evaporator 12.

The heat of liquid of the weakened absorption solution entering vaporizer 35 is also utilized to effect evaporation of refrigerant fluid. Due to evaporation of refrigerant fluid, heat of liquid is abstracted from weakened absorption solution, thereby effecting cooling of the latter. With the temperature of the weakened absorption solution below the temperature of the generator vapors leaving the upper part of generator 10, the heat of condensation and heat of rectification are transferred to weakened absorption solution in vaporizer 35.

By making the weak absorption liquid weaker with the so-called stripping action provided, a lower refrigeration temperature is obtained. The evaporating temperature of refrigerant fluid in evaporator 12 is a function of the partial pressure of refrigerant vapor. The more effectively refrigerant vapor is absorbed from inert gas in absorber 13, the less refrigerant vapor will be contained in the inert gas entering evaporator 12. By further reducing the amount of refrigerant vapor in the inert gas introduced into evaporator 12, the partial pressure of refrigerant vapor in such gas will be less, whereby evaporation of refrigerant fluid will be effected at a lower temperature.

In order to recover and effectively use the refrigerant expelled from weakened absorption liquid in vaporizer 35, the vaporizer is arranged to form a part of an auxiliary circuit for inert gas. As shown in Fig. 1, the left-hand end of vaporizer 35 is connected by a conduit 38 to the upper part of a condenser 39. The lower part of condenser 39 is connected by a conduit 40 to the right-hand end of vaporizer 35 and by a conduit 41 to evaporator 12. The auxiliary gas circuit including vaporizer 35, condenser 39 and connecting conduits 38 and 40 contains an inert gas, such as hydrogen, for example, into which the refrigerant evaporates and diffuses in vaporizer 35. The mixture of refrigerant vapor and inert gas flows from vaporizer 35 into condenser 39 in which the refrigerant is condensed out of the inert gas, and inert gas weak in refrigerant returns from condenser 39 to vaporizer 35. This circulation of gas in the auxiliary gas circuit may be effected by the difference in specific weight of the columns of gas rich and weak, respectively, in refrigerant vapor. The liquid refrigerant formed in condenser 39 flows through conduit 41 into evaporator 12 whereby refrigerant fluid resulting from the so-called stripping action that takes place in vaporizer 35 is effectively utilized to produce a useful refrigerating effect. The conduit 41 is shaped to form a liquid trap so that gas will not flow through this conduit between the auxiliary gas circuit and evaporator 12.

If desired, an arrangement may be provided whereby liquid refrigerant substantially free of absorption liquid may be introduced into evaporator 12 from condenser 11. In such case the absorption liquid vapors may be removed from the generator vapors before the latter reach the condenser 11. This can be accomplished by providing in the conduit 16 a rectifier of any type well known in the art.

The partial pressure of refrigerant vapor in the gas mixture flowing into condenser 39 from vaporizer 35 should be sufficiently high so that condensation of refrigerant is insured in condenser 39 at the prevailing temperature of the refrigerant. The condenser 39 may be cooled in any suitable manner, as by air cooling or by a cooling liquid, such as water, for example. As shown, condenser 39 is provided with a plurality of fins 42 for air cooling. The refrigeration system in Fig. 1 must be operated at a temperature and with a concentration of refrigerant in absorption liquid which is dependent upon the temperature of the cooling medium. A condition for the correct operation of the system in Fig. 1 is that the generator vapors can be liquefied in condenser 11 at a temperature which is sufficiently high so that the partial pressure of refrigerant in vaporizer 35, at the prevailing concentration of refrigerant in the weakened absorption liquid entering the latter from generator 10, will increase to such an extent that the resulting gas mixture of refrigerant and inert gas flowing to condenser 39 can be liquefied at the given condensation temperature of the condenser 39. By way of example only and without limitation, the following data is given to illustrate the conditions in a refrigeration system like that shown in Fig. 1 in which proper operation of the system is being effected.

Temperature of evaporator 12 _____ 0° C.
Temperature of condenser 39 _____ +20° C.
Temperature of generator 10 _____ About +100 to 110° C.
Temperature of vaporizer 35 _____ About +65 to 70° C.
Total pressure in the refrigeration system _____ About 30 kg./cm.²

Figure 2:
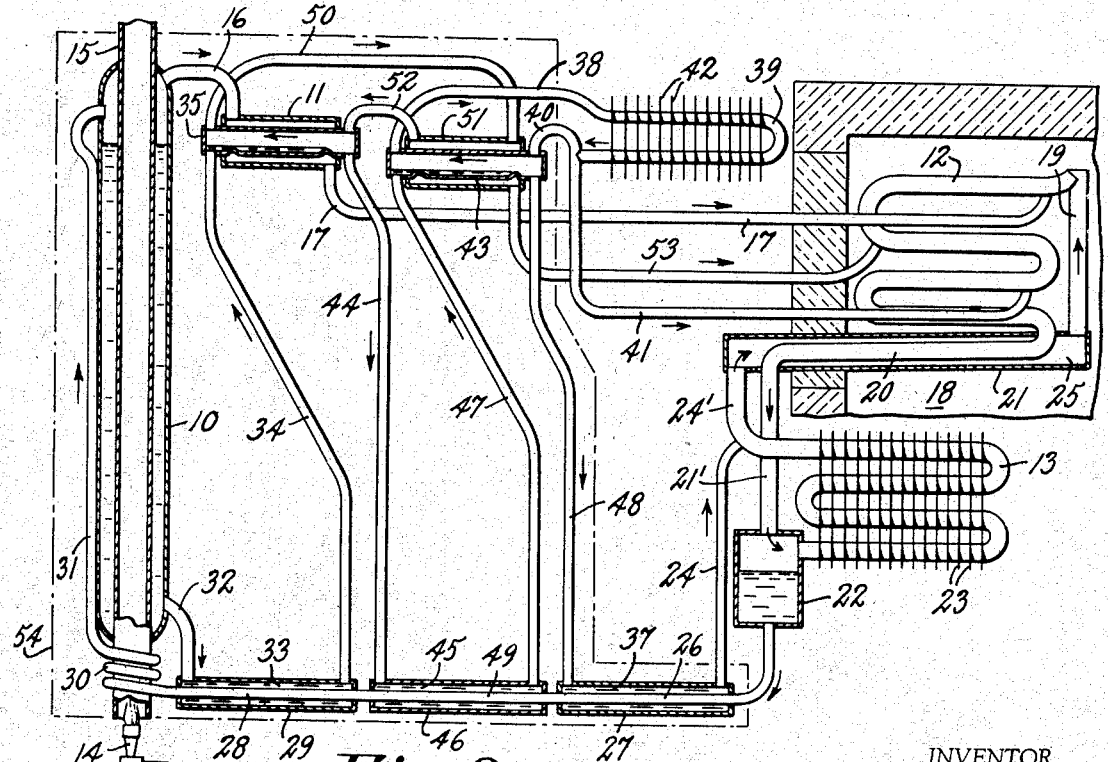
Fig. 2 illustrates another embodiment of the invention shown in Fig. 1.

In Fig. 2 is illustrated another embodiment of the invention in which parts similar to those shown in Fig. 1 are designated by the same reference numerals. In this embodiment a second vaporizer 43 is provided in addition to the vaporizer 35. Weakened absorption liquid flows from the lower part of generator 10 through conduit 32, outer passage 33 of liquid heat exchanger 29, and conduit 34 to vaporizer 35. From vaporizer 35 absorption liquid flows through a conduit 44, outer passage 45 of a liquid heat exchanger 46, and conduit 47 to the second vessel or vaporizer 43. Absorption liquid then flows from vaporizer 43 through conduit 48, the outer passage 37 of liquid heat exchanger 27, and conduit 24 into the upper part of absorber 13.

Absorption liquid enriched in refrigerant flows from absorber 13 into vessel 22, and thence from the latter through the inner passage 26 of liquid heat exchanger 27, inner passage 49 of liquid heat exchanger 46, and inner passage 28 of liquid heat exchanger 29 into coil 30.

The left-hand end of vaporizer 35 is connected by a conduit 50 to one end of a jacket or condenser 51 in thermal exchange relation with the second vaporizer 43. The opposite end of jacket 51 is connected by a conduit 52 to the right-hand end of vaporizer 35. The jacket 51 is also connected by a conduit 53 to evaporator 12 and is formed to provide a liquid trap to prevent flow of gas therethrough.

The left-hand end of the second vaporizer 43 is connected by conduit 38 to the upper part of a condenser 39, the lower part of which is connected by conduit 40 to the right-hand end of the second vaporizer 43 and also by conduit 41 to the evaporator 12.

In vaporizer 35 refrigerant is vaporized out of weakened absorption liquid by the heat of condensation and heat of rectification of generator vapors flowing into condenser 11, as in the embodiment shown in Fig. 1 and described above. The liquid refrigerant formed in condenser 11 flows through conduit 17 to evaporator 12. The vaporizer 35, jacket or condenser 51 and conduit connections 50 and 52 therebetween form an auxiliary circuit for an inert gas, such as hydrogen, for example. The gas mixture of refrigerant vapor and inert gas flows from the vaporizer 35 to the jacket or condenser 51 in which refrigerant is condensed out of the inert gas, and inert gas weak in refrigerant returns from the jacket or condenser 51 to the vaporizer 35. This circulation of inert gas through and between the vaporizer 35 and jacket or condenser 51 may be effected by the difference in specific weight of the columns of gas rich and weak, respectively, in refrigerant vapor. Liquid refrigerant formed in condenser or jacket 51 flows through conduit 53 to evaporator 12.

In vaporizer 43 refrigerant is evaporated out of weakened absorption liquid by the heat of condensation resulting from condensation of refrigerant in jacket or condenser 51. The vaporizer 43, condenser 39 and conduit connections 38 and 40 therebetween form another auxiliary circuit for inert gas. In vaporizer 43 refrigerant is vaporized out of weakened absorption liquid into inert gas by the heat of condensation resulting from condensation of refrigerant in jacket or condenser 51. The mixture of refrigerant and inert gas formed in vaporizer 43 flows in this auxiliary circuit to condenser 39 in which refrigerant is condensed out of the inert gas, and inert gas weak in refrigerant returns from condenser 39 to the vaporizer 43. As in the auxiliary gas circuit just described, the circulation of inert gas through and between the vaporizer 43 and condenser 39 may be effected by the difference in specific weight of the columns of gas rich and weak, respectively, in refrigerant vapor. Liquid refrigerant formed in condenser 39 flows through conduit 41 into evaporator 12.

By utilizing the heat of condensation of vapors formed in vaporizer 35 to expel refrigerant out of absorption solution in the second vaporizer 43, a still greater utilization of the heat input into generator 10 is effected to strip the weakened absorption solution of refrigerant, so that the concentration of refrigerant in absorption solution entering absorber 13 will be at a minimum. Further, all of the additional refrigerant expelled from the weakened absorption solution is effectively recovered, whereby all of the expelled refrigerant may be utilized to produce a useful refrigerating effect. When a number of condensation stages are employed like the condensation stage formed by the auxiliary gas circuit, including vaporizer 35 and condenser 51, the efficiency is improved for every condensation stage provided in that a corresponding increase of pressure in the refrigeration system or a corresponding lowering of the condensation temperature of the condenser 39 is obtained. In the embodiment just described a corresponding change of the average concentration of the absorption solution may be necessary or desirable to maintain the desired conditions to insure proper operation of the refrigeration system. By way of example only and without limitation, the following data is given to illustrate the conditions given in a refrigeration system like that shown in Fig. 2 in which proper operation of the system is being effected.

Temperature of evaporator 12   0° C.
Temperature of condenser 39_   About +10° C.
Temperature of vaporizer 35__  About +110° C.
Temperature of vaporizer 43__  About +60° C.
Temperature of generator 10_   About +130° C.
Total pressure in the refrigeration system _____ About 50 kg./cm.²

In the use of the present invention a number of condensation stages may be employed without unduly increasing the size of the refrigeration system. This is so because only a slight difference in temperature between each condenser and its associated vaporizer is sufficient to effect complete transfer of the heat of condensation to the weakened absorption solution, even in instances where the heat transfer surface between the vaporizer and condenser is relatively small.

In order to simplify the illustrated embodiments of the invention shown in Figs. 1 and 2, the insulation about certain parts of the system and certain vent connections have not been shown. The parts which preferably should be insulated are included within the areas defined by the dotted lines 54 in Figs. 1 and 2.

Figure 3:
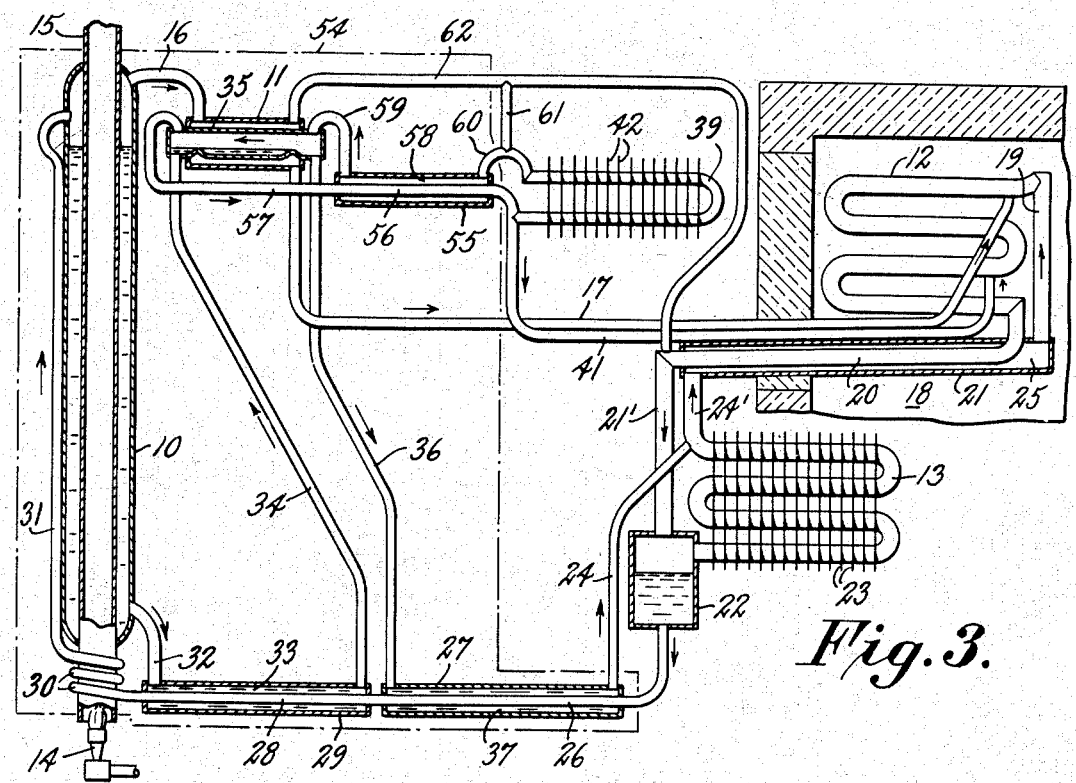
Fig. 3 illustrates more or less diagrammatically a refrigeration system similar to Fig. 1 and in which are included additional elements not shown in Fig. 1.

In Figs. 3 is illustrated an embodiment similar to those shown in Figs. 1 and 2 which includes parts, such as certain vent connections and a gas heat exchanger in an auxiliary gas circuit, not included in the embodiments previously described. The parts of the system in Fig. 3 similar to those shown in Figs. 1 and 2 are designated by the same reference numerals.

In Fig. 3 the auxiliary gas circuit includes a gas heat exchanger 55. As shown, the inner passage 56 of gas heat exchanger 55 is connected in a conduit 57 connecting the left-hand end of vaporizer 35 and the lower part of condenser 39. The outer passage 58 of gas heat exchanger 55 is connected by a conduit 59 to the right-hand end of vaporizer 35, and by a conduit 60 to the upper part of condenser 39.

In the present embodiment the vapor spaces of the condenser 11 and condenser 39 are in communication with the main gas circuit including the evaporator 12 and the absorber 13. This is accomplished by connecting the upper parts of condensers 11 and 39 by vent conduits 60, 61, and 62 to the upper part of conduit 21' through which gas enriched in refrigerant flows from evaporator 12 to absorber 13. It is to be understood that it is contemplated that gas heat exchanger 55 and vent connections like the conduits 60, 61, and 62 may be included in Figs. 1 and 2, and that these parts have been omitted from Figs. 1 and 2 for the purpose of showing features of the invention more clearly.

In order to effect precooling of liquid refrigerant flowing from condenser 11 and 39 to evaporator 12, the conduits 17 and 41 may be arranged in thermal exchange relation with gas heat exchanger 21. The operation of the embodiment shown in Fig. 3 is substantially the same as the embodiment shown in Fig. 1 and described above, and hence the operation of the embodiment in Fig. 3 will not be repeated here.

Figure 4:
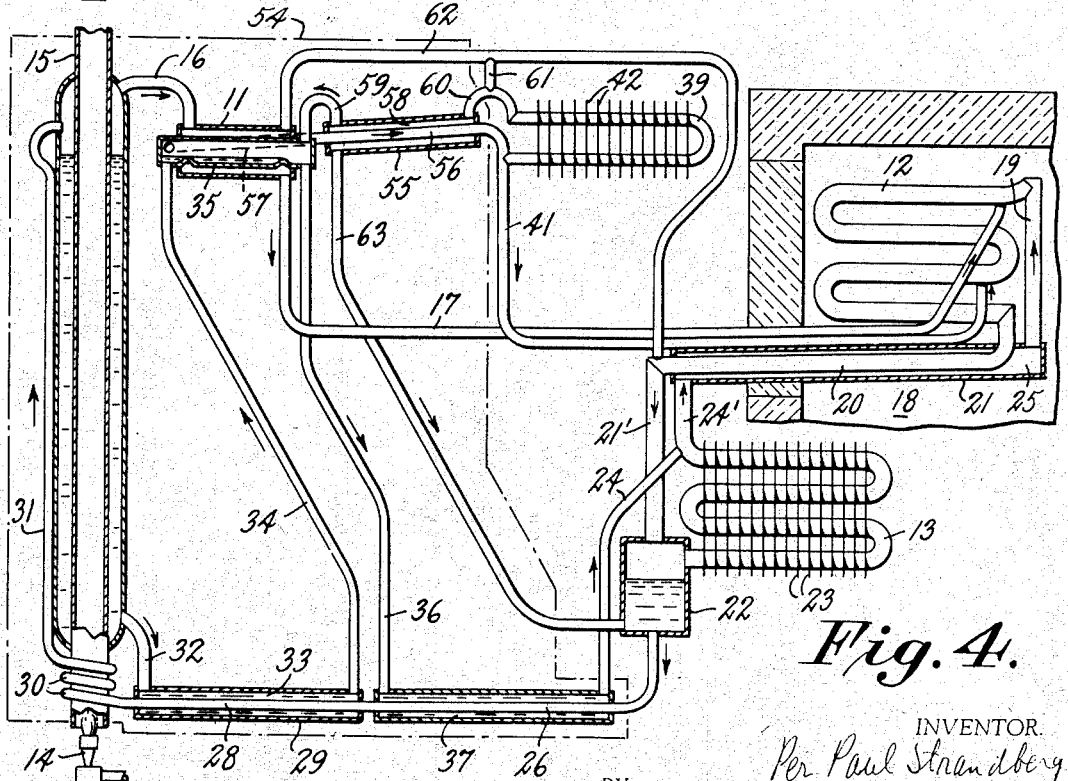
Fig. 4 illustrates still another embodiment of the invention shown in Figs. 1 to 3 inclusive.

In Fig. 4 is illustrated another embodiment of the invention in which the parts similar to those in Fig. 3 are designated by the same reference numerals. In this embodiment the gas heat exchanger 55 is arranged at a sufficiently high elevation and inclined downwardly toward the vaporizer 35, so that rectification of the vapors flowing from vaporizer 35 to condenser 39 is effected. Liquid formed in the inner passage 56 of gas heat exchanger 55 is conducted through conduit 57 to vaporizer 35. In order to remove any liquid which may collect in the outer passage 58 of gas heat exchanger 55, a conduit 63 is connected to the lower part of this passage and to the vessel 22 below the liquid level therein. In other respects the embodiment in Fig. 4 is similar to Fig. 3 and further description of this embodiment will not be given here. As in Figs. 1 and 2, the parts within the areas defined by the dotted lines 54 in Figs. 3 and 4 indicate the parts of the refrigeration system which are preferably insulated.

It has already been pointed out that absorption liquid as well as refrigerant liquid flows through conduit 17 from condenser 11 to evaporator 12. Since a mixture of liquid refrigerant and absorption liquid flows through conduit 17, this conduit may be connected to the part of evaporator 12 primarily employed to effect cooling of space 18. Liquid refrigerant substantially free of absorption liquid flows from condenser 39 to evaporator 12 through conduit 41. The conduit 41 may therefore be connected to the portion of evaporator 12 which is primarily used for freezing ice cubes and the like.

While in the embodiments shown the inert gas and liquid refrigerant are arranged for parallel flow in the evaporator 12, these fluids may be arranged for counter-flow in the evaporator, as well known in the art. The sequence in which liquid refrigerant is introduced into evaporator 12 from the different condensers is governed by the desired number of temperature stages or temperature differences to be maintained in the evaporator. In certain instances, it may be desirable to provide means to accelerate the rate of gas circulation in the auxiliary gas circuits, for example, as by increasing the lengths of the columns of weak and rich gas, in order that the system will operate as near as possible to the condensation point of the gas mixture to be liquefied.

While several embodiments of the invention have been shown and described, such variations and modifications are contemplated as fall within the true spirit and scope of the invention, as pointed out in the following claims.

What is claimed is:

1. An absorption refrigeration system including a generator, means to heat said generator to cause expulsion of refrigerant vapor from and thereby weaken absorption liquid therein, means for conducting weakened absorption liquid from said generator in the presence of inert gas to lower the vapor pressure of the refrigerant fluid and thereby permit further expulsion of refrigerant vapor from and further weakening of the absorption liquid, and a condenser which receives inert gas and refrigerant vapor from said means and in which the refrigerant vapor is condensed to liquid.

2. A system as in claim 1 which also includes a second condenser connected to receive refrigerant vapor from said generator and arranged in heat transfer relation to said means so that heat of condensation is transferred to absorption liquid in said means.

3. A system as in claim 1 which also includes a second condenser connected to receive vapor from said generator, and an evaporator connected to receive liquid from both said condensers.

4. A system as in claim 1 which also includes a second condenser connected to receive vapor from said generator and arranged in heat transfer relation with said means, and an evaporator connected to receive liquid from both said condensers.

5. An absorption refrigeration system including a generator, a condenser connected to receive vapor from said generator, a first circuit for inert gas including an evaporator and an absorber, a second circuit for inert gas including a second evaporator and a second condenser, a circuit for absorption liquid including said generator, absorber, and second evaporator, the latter being connected so that liquid flows therethrough in its path of flow from said generator to said absorber and said first evaporator being connected to receive liquid from said both condensers.

6. A system as in claim 5 in which said first condenser is arranged in heat transfer relation to said second evaporator.

7. A system as in claim 5 in which liquid in said absorption liquid circuit flowing to and from said second evaporator is conducted in heat exchange relation with liquid in said circuit flowing from said absorber to said generator.

8. A system as in claim 5 in which said second circuit for inert gas including a second evaporator and a second condenser also includes a heat exchanger connected therebetween.

9. A system as in claim 5 in which said second circuit for inert gas including a second evaporator and a second condenser also includes a heat exchanger connected therebetween, and a drain conduit for liquid condensate from said heat exchanger to said absorption liquid circuit.

10. A system as in claim 5 which also includes a vent connection from both said condensers to said first circuit for inert gas.

11. An absorption refrigeration system including a generator, a first circuit for inert gas including an evaporator and an absorber, a circuit for absorption liquid including said absorber and said generator and a plurality of vaporizers through which absorption liquid flows in its path of flow from said generator to said absorber, a condenser in heat transfer relation with the first of said vaporizers and connected to receive vapor from said generator and deliver liquid to said evaporator, a second circuit for inert gas including said first vaporizer and a second condenser, the latter being arranged in heat transfer relation with a second of said vaporizers and connected to deliver liquid to said evaporator, and another circuit for inert gas including said second vaporizer and a third condenser, the latter also being connected to deliver liquid to said evaporator.

12. A system as set forth in claim 11 in which the liquid flowing to and from said vaporizers is conducted in heat exchange relation with liquid flowing from said absorber to said generator.

13. A method of refrigeration which includes heating absorption liquid to expel refrigerant vapor therefrom, thereby weakening the absorption liquid, conducting the weakened absorption liquid into the presence of inert gas to cause further expulsion of refrigerant vapor therefrom, the latter diffusing into the gas, and condensing the vapor to liquid to cause separation of the refrigerant from the gas.

14. A method as in claim 13 which also includes liquefying vapor formed in the first expulsion step by heat transfer to absorption liquid in said further expulsion step.

15. A method as in claim 13 which also includes condensing to liquid refrigerant vapor formed in said first expulsion step, and evaporating in the presence of inert gas the liquid formed by both condensing steps.

PER PAUL STRANDBERG.